Nov. 20, 1962   R. SCHLAICH   3,065,325
TEMPERATURE CONTROL APPARATUS
Filed Oct. 24, 1960   3 Sheets-Sheet 1

INVENTOR
Robert Schlaich

BY Michael S. Striker
ATTORNEY

Nov. 20, 1962

R. SCHLAICH 3,065,325

TEMPERATURE CONTROL APPARATUS

Filed Oct. 24, 1960

3 Sheets-Sheet 2

United States Patent Office 3,065,325
Patented Nov. 20, 1962

3,065,325
TEMPERATURE CONTROL APPARATUS
Robert Schlaich, Robert-Bosch-Strasse 103,
Stuttgart-S, Germany
Filed Oct. 24, 1960, Ser. No. 64,505
Claims priority, application Germany Oct. 24, 1959
20 Claims. (Cl. 219—20)

The present invention relates to a temperature control apparatus, and more particularly to an apparatus for effecting gradual heating of a medium to a selected desired temperature.

Apparatus of this type is known in which the selected desired maximum temperature is set by moving an indicating pointer to a corresponding position on a dial, whereupon another pointer is made to respond to the gradually increasing temperature of the heated medium. A heated bimetal element is connected to the settable pointer, and in accordance with its thermal deflection, effects the closing of contacts for disconnecting the heater of the medium shortly before temperature of the medium reaches a selected temperature. Since the heater is still effective for a while, the medium will nevertheless arrive at the selected desired temperature.

The known apparatus of this type has the disadvantage that the bimetal element is deflected corresponding to a constant difference between the switch-off temperature and the desired selected temperature. It has been found that in accordance with the construction of the heater for the medium, it is desirable to switch off the heater earlier, or later, in order to prevent the exceeding of the desired selected temperature of the medium, or heating of the medium to a temperature less than the desired temperature. It will be understood that the after-heating effect after switching off of the heater for the medium, depends on the size of the heater, and the volume of the medium, and other factors, so that the constant difference between the switch-off temperature and the desired temperature which is a characteristic of the prior art constructions, will not accomplish the desired result in all cases.

It is one object of the present invention to overcome this disadvantage of known temperature control apparatus of the above described type, and to provide a temperature control apparatus in which the difference between the switch-off temperature and the desired temperature can be selected.

Another object of the present invention is to effect the switching-off of the heater for the medium by the separation of contacts, at least one of which is mounted on a temperature-deformable element, and to heat the temperature deformable element to different temperatures to obtain a variation of the switch-off temperature.

Another object of the present invention is to provide an apparatus of this type, in which a bimetal element is connected to a settable indicator pointer for turning movement therewith, and to deflect the bimetal element from its normal angular position a selectable lead angle so that a contact on the bimetal element is sooner engaged by the contact moving with the indicator of the actual temperature of the medium to be controlled.

However, even if the system is thus adapted to the prevailing conditions, it is still possible that the desired temperature of the medium is not exactly obtained under particular circumstances, since the temperature increase of the medium after switching off of the heater cannot be completely reliably predicted.

It is therefore another object of the present invention to provide the temperature control apparatus with other means for effecting an intermittent connection and disconnection of the heater for the medium after the first selected switch-off temperature has been reached.

A further object of the present invention is to provide in the apparatus another bimetal element to compensate for the temperature fluctuations of the surrounding air which may have an influence on the control operation.

A further object of the present invention is to provide in the apparatus additional control contact means which close when the actual temperature of the medium exceeds the desired selected temperature, and effect cooling of the medium from the excess temperature down to the desired selected temperature.

With these objects in view, the present invention relates to a control apparatus for controlling the temperature of a medium heated by a heater. One embodiment of the present invention comprises manually settable means for representing a selected desired temperature of the medium, preferably by means of an indicator pointer; temperature-responsive means, preferably including a temperature indicating pointer moving in accordance with the temperature of the medium; a temperature-deformable element, such as a bimetal strip, secured to the settable pointer and having a deformable part with a first contact; another element, preferably also a bimetal strip, having a second contact cooperating with the first contact; resilient means connecting the last-mentioned member with the temperature indicating pointer for movement with the same, but displaceable relative to the same; circuit means for connecting said contacts to means for heating the medium; heating wire means for heating the temperature-deformable element; and control means, such as a potentiometer controlling the heating wire means for varying the deformation of the heated temperature-deformable element.

By adjustment of the potentiometer, the first contact can be deflected corresponding to a desired lead angle and temperature difference relative to the manually settable indicator pointer. At the beginning of the heating operation, the contacts engage each other, while the resilient means permit an angular spacing between the pointers corresponding to the difference between the starting temperature and the desired temperature. When the switch-off temperature, corresponding to the position of the second contact, is reached, the temperature responsive pointer moves the first contact away from the second contact and interrupts the connection to the heater for the medium which generally reaches the desired selected temperature due to the thermal capacity of the heater which continues heating after being switched off. By the adjustment of the lead of the second contact relative to the settable indicator pointer, the system can be adapted to varying conditions.

In a modified embodiment of the present invention, the first contact engages a third contact on the settable pointer, when the temperature indicating pointer moves to a position corresponding to a temperature exceeding the selected temperature. Engagement of the first and third contacts effects connection of a cooling means into the circuit, so that the medium is cooled to the desired selected temperature.

When the bimetal element cools off after effecting disconnection of the heater at the selected switch-off temperature, the first and second contacts may engage each other again. In accordance with the preferred embodiment of the present invention, the heating wire is controlled by these contacts to be again connected to a source of power, so that the heating of the bimetal element is again started, and the contacts again separate. In this manner, an intermittent actuation of the heater for the medium is obtained after the heater was switched off the first time, considering that every separation of the first and second contacts effects a disconnection of the heater. The intermittent heating of the medium near the desired selected temperature, assures that the desired selected temperature will be accurately reached and maintained regardless of the prevailing conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
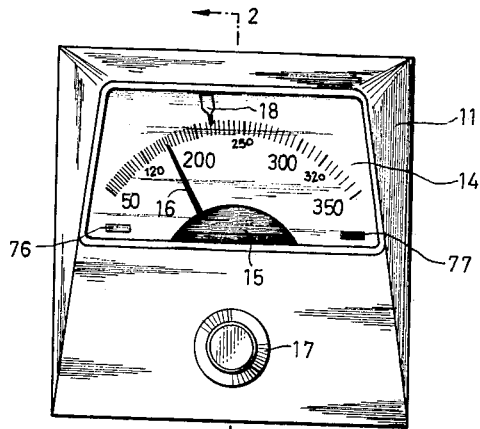
FIG. 1 is a front view of a temperature control apparatus according to the present invention.
Figure 2:
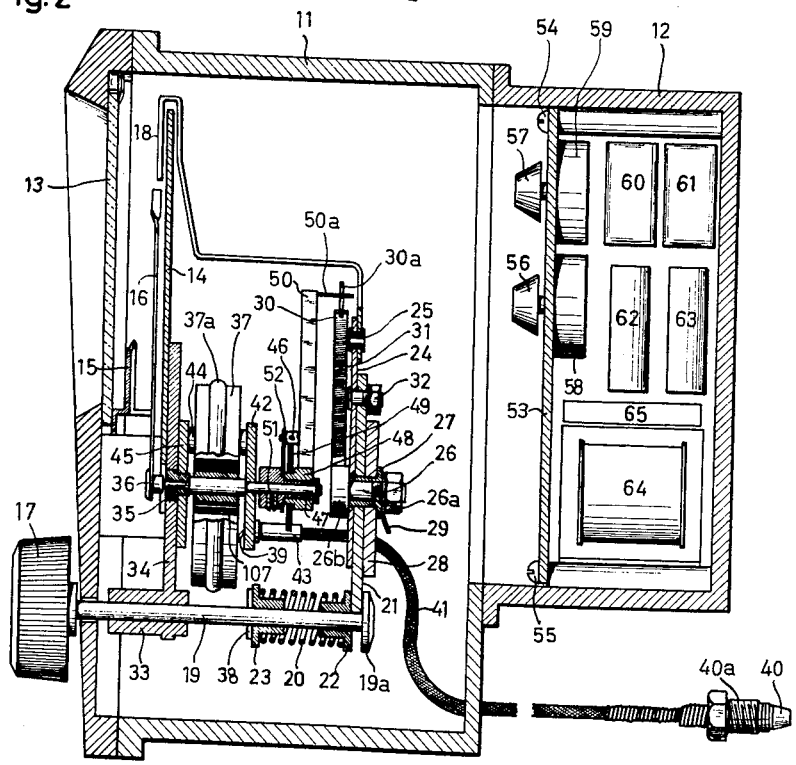
FIG. 2 is a sectional view taken on line 2—2 in FIG. 1.
Figure 3:
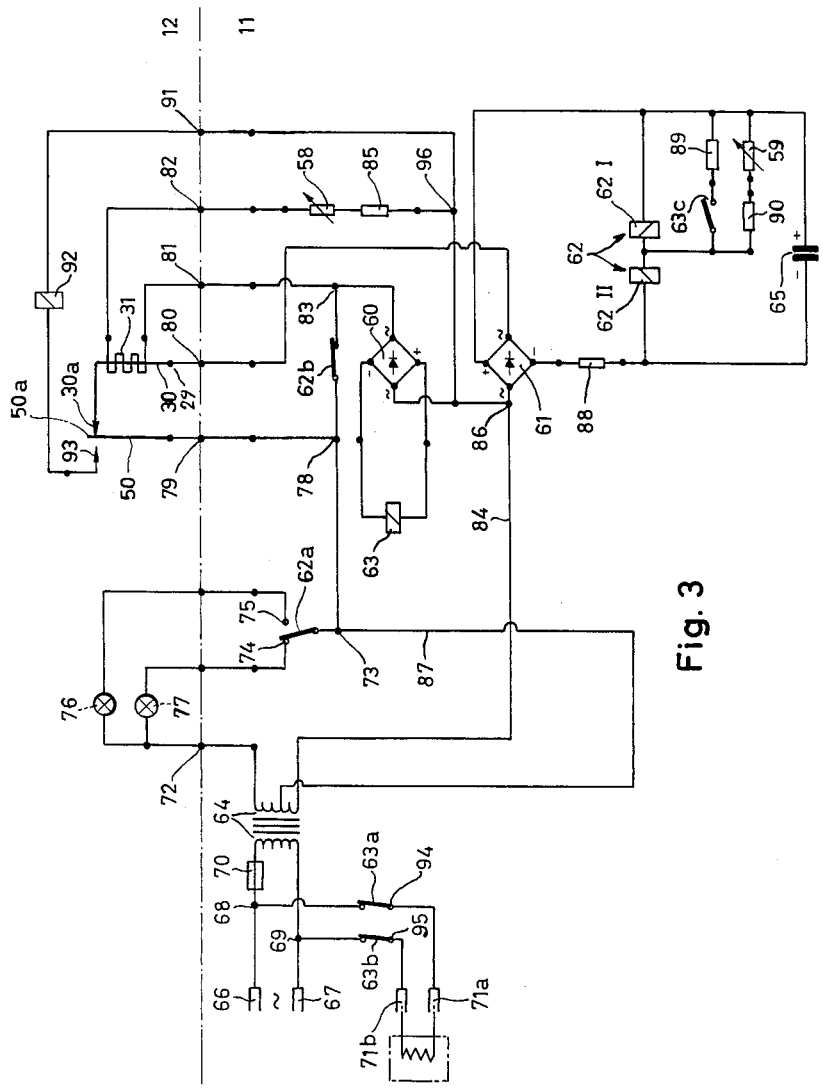
FIG. 3 is a diagram illustrating the electric circuit of the apparatus.

Referring now to FIGS. 1 to 3 of the drawing, the temperature control apparatus comprises two housing parts 11 and 12 which are preferably connected by hinge, not shown, so that the housing part 12 can be tilted into a position in which the wall 53 and control knobs 56 and 57 are accessible. A number of electric instruments are mounted in housing part 12, as will be explained hereinafter. Housing part 11 supports the indicating parts of the instrument, and has a front wall, constructed as a detachable cover, and being provided with a window 13 behind which a dial 14 is arranged. Dial 14 has a temperature scale indicating, for example, temperatures between 50 and 350° C. Control lamps 76 and 77 are provided on the dial, and are of different colors to indicate operational conditions. A first pointer 18 can be manually set to a selected desired temperature, while a second pointer 16 indicates the actual temperature of a medium whose temperature is to be controlled and regulated. The inner part of pointer 16 is covered by a part-circular plate 15.

A plurality of supporting walls 34, 45, 42, and 28 are fixed to housing 11. Spacing bolts 44 connect wall 45 and wall 42 to wall 34, and other spacing bolts 106, shown in FIG. 4, connect walls 34 and 35 to the supporting wall 28.

Supporting wall 34 has a bearing portion 33 in which shaft 19 of knob 17 is turnably mounted. At the end of shaft 19, a friction flange 19a is fixed, and another flange member 22, slidably mounted on shaft 19, is urged by spring 20 toward flange 19a so that a circular disc 21 is frictionally engaged between flanges 22 and 19a. Spring 20 abuts another flanged member 23 which is fixed on shaft 19 by a pin 38.

Disc 21 is turnably mounted on a bushing 27 which is secured to the support wall 28 by a bolt 26 having a head portion 26b, and a threaded portion engaged by a nut 26a. A terminal connector 29 is clamped between nut 26a and bushing 27. An arm 24 is secured to disc 21 by threaded means 32, and has a bore which bushing 27 passes through. Pointer 18 is secured by a rivet 25 to arm 24, so that members 21, 24 and 18 turn together when knob 17 is turned. In this way, pointer 18 can be manually set by operation of knob 17 until it indicates a desired temperature value on the scale of the dial 14.

A temperature-deformable element is secured to the head 26b of bolt 26, and extends in substantially radial direction with respect to the turning axis of the manually settable indicator means 21, 24, 18. The temperature-deformable element is shown to be a bimetal strip 30 terminating at its outer end in a contact 30a. Bimetal element 30 turns with the manually settable indicator means, but when the bimetal element is heated, its outer part with contact 30a will move relative to the pointer 18 so that the angular position of contact 30a is different when the bimetal element 30 is cold, or heated, respectively.

A heating winding means 31 is wound about the bimetal element 30 and is connected in series to a potentiometer 58 as shown in the diagram of FIG. 3, potentiometer 58 being located in housing 12 and adjusted by knob 56. Consequently, the heat supplied by electric resistance winding 31 to the bimetal element 30 can be regulated, and a corresponding deflection of the outer part of the bimetal element with contact 30a can be obtained.

The pointer 16 is coupled by a sleeve 36 to a shaft 35 mounted in a bushing on supporting plate 34. Supporting plate 42 also supports shaft 35 for turning movement, and a Bourdon tube 37 is spirally wound about shaft 35 between supporting walls 42 and 45. Bourdon tube 37 has a bead 37a and is connected at the inner end thereof to shaft 35 by means of a compensating spiral 107. The outer end of Bourdon tube 37 is fixed to a housing part so that pointer 16 will turn when the liquid in the Bourdon tube 37 is heated. A capillary tube 39 connects the Bourdon tube 37 through a duct in plate 42 to a flexible metal hose 41. One end of hose 41 is protected by flange sleeve 43, and the other end of hose 41 passes through the wall of housing 11, and has a free end connected to a temperature feeler 40 provided with a thread 41a by which it is attached to the wall of a container filled with the medium whose temperature is to be sensed and controlled. As the temperature of the medium increases, Bourdon tube 37 will turn pointer 16 to indicate a higher temperature on the scale of dial 14.

A bushing 47 is secured to the thinner end of shaft 35 by a set screw 51 and turns with the same. A projecting arm 52 is secured to bushing 47 and is connected at its outer end by a pin 46 to the outer end of a spiral spring 49 whose inner end is secured to a bushing 48 turnably mounted on the fixed bushing 47. An arm element 50 is secured to bushing 40 and is capable of turning with the same while tensioning spring 49. In the preferred embodiment of the invention, the element 30 is temperature deformable, and is a bimetal strip extending in radial direction with respect to the axis of shaft 35. The dimensions and temperature response characteristics of the bimetal element 30 are chosen in view of the characteristics of bimetal element 30 in such a manner that temperature fluctuations of the air surrounding the apparatus are compensated. Bimetal element 50 has at its outer end a transversely projecting contact part 50a which cooperates with the contact part 30a on bimetal element 30. Spring 49 is strong enough to effect turning of bimetal element 50 when pointer 16 turns. However, when contact part 50a abuts contact 30a, and turning movement of bimetal element 50 is blocked, the spring 49 resiliently gives and permits independent turning movement of the pointer 16.

The rear housing 12 contains two potentiometers 58 and 59, controlled by knobs 56 and 57 and mounted on a wall 53 which is secured to projecting parts of the housing by screws 54 and 55.

FIG. 2 shows the outline of rectifier means 60 and 61, two relays 62 and 63, a condenser 65, and a transformer 64. The functions and connections of these elements will be best understood with reference to FIG. 3.

A voltage source is connected to the terminals 66 and 67 which are connected through the fuse 70 to the primary winding of a transformer 64. Branch lines 68 and 69 lead to contacts 63a and 63b of the relay 63 and further to the output terminals 71a, 71b which are connected to means 71c for heating a medium whose temperature is to be controlled.

The secondary winding of transformer 64 is tapped to supply a voltage of approximately 5.5 volts to the connecting points 72 and 73. Point 72 is a terminal located in housing part 11 of the apparatus which is assumed to be located above the dash-and-dot line in FIG. 3. Electric connections in the apparatus are indicated by broken lines.

The point 73 of the connection 87 is normally connected by a contact arm 62a of a relay 62 to a contact 74. Upon energization of relay 62, contact arm 62a connects the tap of the transformer 64 to point 75. A first signal lamp 76, which may be green, is connected between points 75 and 72, and a second signal lamp, which may be red, is connected between points 74 and 72. Signal lamps 76 and 77 are also shown in FIG. 1 on the dial of the apparatus.

A line connects point 75 with a point 78 which is connected on one hand to a terminal 79 in the apparatus housing 12, and on the other hand to a contact arm 62b of relay 62. Terminal 79 is electrically connected to the element 50, which, as explained above, may be made of bimetal. The bimetal element 30, about which winding 31 passes, is connected to terminal 80. A connection 84 connects transformer 64 through a rectifier 61 to terminal 80. The electric heating winding 31 is connected to the terminals 81 and 82. Terminal 81 is connected to the alternating current output of rectifier 60 which is also connected at point 86 to line 84. When contact arm 62b of relay 62 closes, terminal 81 is connected to point 78 and through line 87 to the transformer 64.

The other terminal of heating winding 31 is connected through the variable potentiometer 58 and a resistor 85 to a point 96 of the line 84 which leads to the transformer 64. By adjustment of the potentiometer 58, the current flowing through heating wire 31 can be regulated so that the bimetal element 30 can be deformed to different degrees.

The direct current connections of rectifier 60 lead to a control relay 63 controlling contacts 63a and 63b to which the output terminals 71a and 71b are connected. When contacts 63a and 63b are open, no current will flow from the power source 66, 67 to output terminals 71a and 71b and to the heater for the medium. If contacts 63a and 63b are closed by the energized relay 63, the heater will effect heating of the medium.

The direct current output terminals of rectifier 61 are connected through a resistor 88 to a condenser 65. A second connection is established through the windings 62I and 62II of the relay 62. The winding 62I has greater resistance, and is shunted by two lines, one of which includes the contact 63c of relay 63 and a resistor 89, while the other line includes the resistor 90 and the potentiometer 59.

The point 96 and thereby the transformer is also connected to a terminal 91 in housing 11, 12. Terminal 91 is connected through a relay 92 to a third contact 93 which will be explained with reference to FIGS. 4 and 5. Relay 92 effects, when energized, the actuation of a cooling means by which the medium is cooled, such cooling being applied if the selected maximum temperature is exceeded.

When the apparatus is not connected to a source of power, all contact arms are shifted out of the position illustrated in FIG. 3. For example, contacts 63a and 63b are open, and contact 63c is closed. Contact 62a engages contact 75, and contact 62b is open.

The apparatus is first connected to a source of power by means of terminals 66 and 67, whereupon the connections between the electric parts in housings 11 and 12 are established by a series of plug and socket contacts, generally indicated by reference numerals 79 to 82. The temperature feeler 40 is screwed into the wall of the container holding the medium, so that the feeler is in contact with the medium whose temperature is to be controlled. The knob 17 on housing 11 is turned until the settable indicator pointer 18 points to the selected maximum temperature, for example 220° C., as shown in FIG. 1. Since bimetal element 30 is connected to pointer 18 for turning movement, it will move to a corresponding angular position with contact 30a.

The indicating pointer 16 is still located in its lowest position, since the medium is not yet heated. Due to the engagement between the projecting contact parts 30a and 50a, the element 30 is held in an angular position corresponding to the position of the settable indicator 18, that is, at an angle to the pointer 16. This is possible, since element 50 is connected to pointer 16, and more particularly to its shaft 36 by the spiral spring 49. Arm 52 and member 46, however, are in an angular position corresponding to pointer 16.

Since contacts 50a and 30a engage each other, the circuit of rectifier 61 is closed over points 78, 73, line 87 on one hand, and line 84 and terminal 80 on the other hand. Rectifier 61 produces a direct current which flows through resistor 89, the still closed contact 63c, winding 62II, and resistor 88. At the same time, condenser 65 is charged.

Since winding 62II is energized, a contact 62b is closed, connecting the heating wire 31 to the transformer over points 78, 73 and line 87. The other end of the heating wire 31 is connected through terminal 82, potentiometer 58, resistor 85, points 96, 86 and line 84 to the transformer. When contact 62b closes, current flows through the heating wire 31, and the bimetal element 30 is deformed and deflected from its previous angular position so that contact 30a moves in counterclockwise direction as viewed in FIG. 1 to a position corresponding to a temperature less than the temperature selected by setting pointer 18. Contact 50a follows such movement due to the resilient action of spring 49, and contacts 30a and 50a remain in conductive engagement.

At the same time, the energized relay winding 62II shifts contact arm 62a from contact 75 to contact 74 so that the red control lamp 77 lights up, indicating that the heating wire 31 is connected into the circuit and effects deformation of the bimetal element 30. Closing of contact 62b also connects the rectifier 60 into the circuit, since point 83 is now connected to point 78, and point 83 is connected to the rectifier. Consequently, relay 63 is energized by the direct current produced by rectifier 60, and closes contacts 63a and 63b.

At the same time, contact 63c opens, the holding winding 62I of relay 62 is energized through resistor 90 and potentiometer 59, and the relay contacts 62a and 62b are held by relay winding 62I. All contacts are now in the operative condition shown in FIG. 3.

Since a source of power connected to input terminal 66, 67 is connected through relay contact 63a and 63b to the output terminal 71a, 71b, a heater, not shown, which is connected to output terminals 71a, 71b, is energized to heat the medium whose temperature is to be controlled.

The temperature of the thus heated medium gradually increases, and the temperature-responsive Bourdon tube 37 responds to the thermal expansion of the medium sensed by feeler 40, and turns the temperature indicator pointer 16 in clockwise direction as viewed in FIG. 1. Consequently, the angle between pointer 16 and bimetal arm 30 and bimetal arm 50 is gradually reduced.

As explained above, the end of bimetal arm 30 with contact 30a is no longer located at the same angle as pointer 18, since the heating wire 31 has deflected the temperature-deformable arm 30 so that its position corresponds to a lesser temperature than indicated by pointer 18. The lead angle may, for example, correspond to 20° C. The exact amount of the lead angle can be determined by operation of the control potentiometer 58 by which the flow of current in wire 31, and thereby the amount of heat supplied to the bimetal element 30 can be adjusted.

When pointer 16 reaches an angular position corresponding to the temperature represented by the deflected bimetal element 30, which may be 20° C. below the desired maximum temperature selected by setting of pointer 18, contact 50a will separate from contact 30a, since part 46, which turns with pointer 16, engages arm element 50 and turns the same in clockwise direction as viewed in FIG. 1. When the contact 30a and 50a are thus separated, the current through winding 31 is maintained for a short time by the discharge of condenser 85 through relay windings 62I and 62II. When condenser 65 is discharged, relay 62 is de-energized, opens contact 62b, disconnects rectifier 60, de-energizes relay 63, so that contacts 63a and 63b open, and shifts contact arm 62a to engage contact 75 so that the green signal lamp 76 lights up, indicating a condition of the apparatus in which the heater for the medium is disconnected by the open contacts 63a and 63b, and the heating wire 31 is also disconnected.

It will be understood that by operation of the potentiometer 58, the lead angle at which the switch-off operation starts can be adjusted in accordance with the prevailing conditions, such as volume of the medium and heat capacity of the heater, so that when the heater is switched off, the after-heating effect of the electric heater will bring the medium to the desired selected temperature without exceeding the same or without remaining below the same.

However, the apparatus is adapted for a further novel and advantageous operation. When the bimetal element 30 has cooled off, it will straighten out and contact 30a will move to a position substantially aligned with the settable indicator pointer 18. If pointer 16 has not traveled very far in the meantime, contact 30a will again engage contact 50a, so that the conditions illustrated in FIG. 3 are again obtained, contact 63a and 63b are closed, and the medium is again heated. However, as soon as bimetal element 30 is again deformed by the heating effect of wire 31, contacts 30a and 50a will separate and effect disconnection of the heater for the medium. In this manner, the medium is again heated for a short time, which may be adjusted by suitable selection of condenser 65. Such intermittent short heating periods will assure that the medium is exactly heated to the desired selected temperature.

It is therefore apparent that in accordance with the present invention the heater is first switched off at an adjustable and selectable "switch-off" temperature, which is below the selected desired temperature, whereupon the heater is intermittently activated to gradually approach the selected maximum temperature. The apparatus need only be once set by potentiometers 58 and 59 in accordance with the prevailing conditions, whereupon the temperature control is fully automatically carried out by the apparatus as long as the conditions are not changed.

The arm element 50 is preferably also a temperature-deformable bimetal strip which will respond to temperature variations of the surrounding air, thereby slightly changing the position of contact 50a to compensate for fluctuations of the temperature of the surrounding air. The dimensions of arms 30 and 50, and the bimetals of which they are constructed, are chosen in such a manner as to effect the best possible compensation.

Under certain circumstances, and due to outside influences, it may be that the temperature of the medium exceeds the maximum temperature. In this event, it is advantageous to provide a cooling means, not shown, which cools the medium until its temperature drops again to the desired selected temperature.

Figure 4:
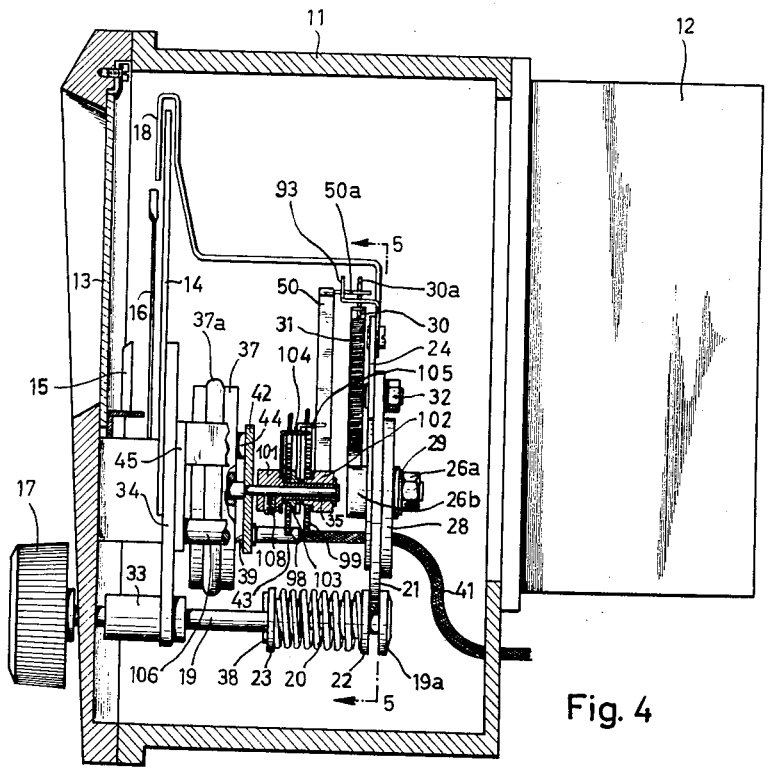
FIG. 4 is a sectional view corresponding to FIG. 2, but illustrating a modified embodiment of the invention.
Figure 5:
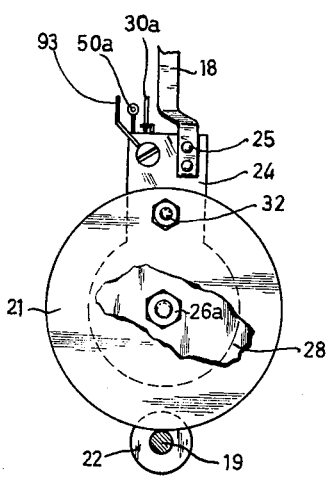
FIG. 5 is a fragmentary front view taken on line 5—5 in FIG. 4 and illustrating a detail.

A modified embodiment of the present invention is illustrated in FIGS. 4 and 5 which is provided with additional means for connecting a cooling means into a circuit. The apparatus as shown in FIGS. 4 and 5 corresponds substantially to the apparatus described with reference to FIGS. 1 and 2, and corresponding parts are indicated by corresponding reference numerals.

In the embodiment of FIGS. 4 and 5, the arm 50 is deflectable in opposite turning directions out of its normal position, whereas in the embodiment of FIG. 2, arm 50 is turnable only in one direction relative to pointer 16.

Referring now to FIG. 4, on the bushing 101, which is secured by screw 108 to shaft 35, two bushings 102 and 103 are turnably mounted. A spiral spring 98 is secured at one end thereof to bushing 103, while its other end is secured to an arm 104 fixed on bushing 101 and shaft 35. The second spiral spring 99 is secured with its inner end to bushing 102, while the outer end of spring 99 is secured to an arm 105 which is fixed on bushing 103. Arm 105 has a transverse projection cooperating with element 50, while arm 104 has a transverse part cooperating with arm 105.

A third contact 93 is secured to member 24 for movement with the settable indicator pointer 18. Contacts 50a is located between contacts 30a and 93, as also shown in FIG. 5.

Contact 93 is shown in FIG. 3 to be connected to a relay 92 which activates a cooling means, not shown, for cooling the medium when the circuit is completed through contact 93, 50a, element 50, terminals 79 and 91 and lines 84 and 87.

In the event that in spite of the above described operation of contacts 30a and 50a, the selected desired maximum temperature is exceeded, contact 50a engages contact 93. If the temperature rises further and indicator arm 16 with shaft 35 turns beyond the selected maximum temperature, element 50 and contact 50a do not move further, which is possible due to the resilient connection between shaft 35 and the bushing 102.

When contacts 93, 50a close, the cooling means, not shown, for the medium is activated by relay 92, and the medium is cooled until the temperature indicating pointer 16 returns to a position indicating the selected maximum temperature, at which contact 50a separates from contact 93, which is of course stationary, so that the cooling means is disconnected.

Further regulation of the temperature is carried out as above described by the play of contacts 30a and 50a.

It will be understood that each of the elements described above, or two or more together, may also find a useful application in other types of temperature control apparatus differing from the types described above.

While the invention has been illustrated and described as embodied in a temperature control apparatus including means for determining a switch-off temperature below a selected maximum temperature, and means for intermittently effecting heating of a medium when the same approaches a selected maximum temperature, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Temperature control apparatus, comprising, in combination, manually settable means for representing a selected desired temperature of a medium; temperature responsive means adapted to sense the temperature of the medium; a temperature-deformable element secured to one of said means and having a deformable part movable relative to the same, said part having a first contact; a member having a second contact cooperating with said first contact; resilient means connecting said member with the other of said means for movement with the same, and displaceable relative to the same so that said member is displaced when said contacts engage each other while the temperature of the medium is different from the selected temperature; means for heating the medium; circuit means for connecting said contacts to said means for heating the medium; heating means for heating said temperature-deformable element; and control means operatively connected to and controlling said heating means for adjusting the same for varying the deformation of said heated temperature-deformable element whereby the position of said first contact relative to said one means can be adjusted so that said contacts separate when said temperature-responsive element senses a selectable temperature below the selected temperature to which said settable means is set.

2. Temperature control apparatus, comprising, in combination, manually settable means for representing a selected desired temperature of a medium; temperature-responsive means adapted to sense the temperature of the medium; a first temperature-deformable element secured to one of said means and having a deformable part movable relative to the same, said part having a first contact; a second temperature-deformable element having a second contact cooperating with said first contact; resilient means connecting said second temperature-deformable element with the other of said means for movement with the same, and displaceable relative to the same so that said member is displaced when said contacts engage each other while the temperature of the medium is different from the selected temperature; means for heating the medium; circuit means for connecting said contacts to said means for heating the medium; heating means for heating one of said temperature-deformable elements; and control means operatively connected to and controlling said heating means for adjusting the same for varying the deformation of said heated temperature-deformable element whereby the position of said first contact relative to said one means can be adjusted so that said contacts separate when said temperature-responsive element senses a selectable temperature below the selected temperature to which said settable means is set.

3. Temperature control apparatus, comprising, in combination, manually settable means for representing a selected desired temperature of a medium; temperature-responsive means adapted to sense the temperature of the medium; a first temperature-deformable element secured to said manually settable means and having a deformable part movable relative to the same, said part having a first contact; a second temperature-deformable element having a second contact cooperating with said first contact; resilient means connecting said second temperature-deformable element with said temperature-responsive means for movement with the same, and displaceable relative to the same so that said member is displaced when said contacts engage each other while the temperature of the medium is different from the selected temperature; means for heating the medium; circuit means for connecting said contacts to said means for heating the medium; heating wire means for said first temperature-deformable element; and control means operatively connected to and controlling said heating wire means for adjusting the same for varying the deformation of said heated temperature-deformable element whereby the position of said first contact relative to said manually settable means can be adjusted so that said contacts separate when said temperature-responsive element senses a selectable temperature below the selected temperature to which said settable means is set.

4. Temperature control apparatus, comprising, in combination, manually settable first indicator means for representing a selected desired temperature of a medium; temperature-responsive means including a temperature feeler adapted to sense the temperature of the medium; second indicator means connected to said temperature-responsive means for indicating the temperature of the medium; a first temperature-deformable element secured to said first indicator means and having a deformable part movable relative to said first indicator means, said part having a first contact; a second temperature-deformable element having a second contact cooperating with said first contact; means for heating the medium; circuit means for connecting said contacts to said means for heating the medium; resilient means connecting said second temperature-deformable element with said second indicator means for movement with said second indicator means, and displaceable relative to the same; heating means for heating one of said temperature-deformable elements; and control means operatively connected to and controlling said heating means for adjusting the same for varying the deformation of said one temperature-deformable element whereby the position of said first contact can be adjusted so that said contacts separate when said temperature-responsive element senses a selectable temperature below the selected temperature to which said first indicator means is set.

5. Temperature control apparatus, comprising, in combination, manually settable first indicator means for representing a selected desired temperature of a medium; temperature-responsive means including a temperature feeler adapted to sense the temperature of the medium; second indicator means connected to said temperature-responsive means for indicating the temperature of the medium; a first temperature-deformable element secured to said first indicator means and having a deformable part movable relative to said first indicator means, said part having a first contact; a second temperature-deformable element having a second contact cooperating with said first contact; means for heating the medium; circuit means for connecting said contacts to said means for heating the medium; resilient means connecting said second temperature-deformable element with said second indicator means for movement with said second indicator means, and displaceable relative to the same; heating means for heating said first temperature-deformable element; and control means operatively connected to and controlling said heating means for adjusting the same for varying the deformation of said first temperature-deformable element whereby the position of said first contact can be adjusted relative to said first indicator means so that said contacts separate when said temperature-responsive element senses a selectable temperature below the selected temperature to which said first indicator means is set.

6. Temperature control apparatus, comprising, in combination, a support; manually settable first indicator means mounted on said support for turning movement about a first axis and representing a selected desired temperature of a medium; temperature-responsive means including a temperature feeler adapted to sense the temperature of the medium; second indicator means for turning movement about a second axis and connected to said temperature-responsive means for indicating the temperature of the medium; a first temperature-deformable element secured to said first indicator means in the region of said first axis and having a deformable part spaced from said first axis and being movable relative to said first indicator means, said part having a first contact; a second element having a second contact cooperating with said first contact; means for heating the medium; circuit means for connecting said contacts to said means for heating the medium; resilient means connecting said second element with said second indicator means in the region of said second axis for turning movement with said second indicator means, and displaceable relative to the same; heating means for heating said first temperature-deformable element; and control means operatively connected to and controlling said heating means for adjusting the same for varying the deformation of said first temperature-deformable element whereby the angular position of said first contact can be adjusted relative to said first indicator means so that said contacts separate when said temperature-responsive element senses a selectable temperature below the selected temperature to which said first indicator means is set.

7. An apparatus as set forth in claim 6 wherein said manually settable first indicator means includes a pointer, a disc turnably mounted on said support and carrying said pointer, and manually operated means frictionally connected to said disc for turning the same and said pointer.

8. An apparatus as set forth in claim 6 wherein said temperature-responsive means includes a Bourdon tube connected to said second indicator means.

9. An apparatus as set forth in claim 8 and including a shaft fixedly connected to said pointer, to said Bourdon tube, and to one end of said resilient means; said resilient means being a spiral-shaped spring having the other end connected to said second element.

10. An apparatus as set forth in claim 9 wherein said first temperature-deformable element is an elongated bimetal strip extending in radial direction with respect to the correlated axes of said first and second indicator means; and wherein said axes coincide.

11. An apparatus as set forth in claim 10 wherein said second element includes a radially extending bimetal strip, and a bushing turnable on said shaft and secured to said other end of said spiral-shaped spring.

12. Temperature control apparatus, comprising, in combination, manually settable means for representing a selected desired temperature of a medium; temperature-responsive means adapted to sense the temperature of the medium; a temperature-deformable element secured to one of said means and having a deformable part movable relative to the same, said part having a first contact; a member having a second contact cooperating with said first contact; resilient means connecting said member with the other of said means for movement with the same, and displaceable relative to the same so that said member is displaced when said contacts engage each other while the temperature of the medium is different from the selected temperature; means for heating the medium; circuit means for connecting said contacts to said means for heating the medium; heating wire means surrounding said temperature-deformable element for heating said temperature-deformable element; and control means including potentiometer means connected into said circuit means and to said heating wire means for controlling the current flowing through the same for varying the deformation of said heated temperature-deformable element whereby the position of said first contact relative to said one means can be adjusted so that said contacts separate when said temperature-responsive element senses a selectable temperature below the selected temperature to which said settable means is set.

13. Temperature control apparatus, comprising, in combination, a support; manually settable first indicator means mounted on said support for turning movement about a first axis and representing a selected desired temperature of a medium; temperature-responsive means including a temperature feeler adapted to sense the temperature of the medium; second indicator means for turning movement about a second axis and connected to said temperature-responsive means for indicating the temperature of the medium; a first temperature-deformable element secured to said first indicator means in the region of said first axis and having a deformable part spaced from said first axis and being movable relative to said first indicator means, said part having a first contact; a second element having a second contact cooperating with said first contact; means for heating the medium; circuit means for connecting said contacts to said means for heating the medium; resilient means connecting said second element with said second indicator means in the region of said second axis for turning movement with said second indicator means, and displaceable relative to the same; heating wire means surrounding said first temperature-deformable element; and control means including potentiometer means connected into said circuit means and to said heating wire means for controlling the current flowing through the same for varying the deformation of said first temperature-deformable element whereby the angular position of said first contact can be adjusted relative to said first indicator means so that said contacts separate when said temperature-responsive element senses a selectable temperature below the selected temperature to which said first indicator means is set.

14. Temperature control apparatus, comprising, in combination, manually settable means for representing a selected desired temperature of a medium; temperature-responsive means adapted to sense the temperature of the medium; a temperature-deformable element secured to one of said means and having a deformable part movable relative to the same, said part having a first contact; a member having a second contact cooperating with said first contact, said first and second bimetal elements being arranged and constructed in such a manner as to compensate temperature fluctuations of the air surrounding the apparatus; resilient means connecting said member with the other of said means for movement with the same, and displaceable relative to the same so that said member is displaced when said contacts engage each other while the temperature of the medium is different from the selected temperature; means for heating the medium; circuit means for connecting said contacts to said means for heating the medium; heating wire means surrounding said temperature-deformable element for heating said temperature-deformable element; and control means including potentiometer means connected into said circuit means and to said heating wire means for controlling the current flowing through the same for varying the deformation of said heated temperature-deformable bimetal element whereby the position of said first contact relative to said one means can be adjusted so that said contacts separate when said temperature-responsive element senses a selectable temperature below the selected temperature to which said settable means is set.

15. Temperature control apparatus, comprising, in combination, a support; manually settable first indicator means mounted on said support for turning movement about a first axis and representing a selected desired temperature of a medium; temperature-responsive means including a temperature feeler adapted to sense the temperature of the medium; second indicator means for turning movement about a second axis and connected to said temperature-responsive means for indicating the temperature of the medium; a first temperature-deformable element secured to said first indicator means in the region of said first axis and having a deformable part spaced from said first axis and being movable relative to said first indicator means, said part having a first contact; a second element having a second contact cooperating with said first contact; means for heating the medium; circuit means for connecting said contacts to said means for heating the medium; first resilient means secured to said second indicator means in the region of said second axis and having a first coupling means cooperating with said second element; second resilient means mounted on said second indicator means for turning movement about said second axis and having a second coupling means cooperating with said first coupling means and fixedly connected to said second indicator means, said first and second resilient means connecting said second element with said second indicator means in the region of said second axis for turning movement with said second indicator means, and displaceable relative to the same in opposite directions of rotation; a third contact secured to said first indicator means for movement therewith, said second contact being located between said first and third contacts; a cooling means for the medium; said circuit means being connected to said second and third contacts and to said cooling means for activating said cooling means for the medium; heating means for heating said first temperature-deformable element; and control means operatively connected to and controlling said heating means for adjusting the same for varying the deformation of said first temperature-deformable element whereby the angular position of said first contact can be adjusted relative to said first indicator means so that said contacts separate when said temperature-responsive element senses a selectable temperature below the selected temperature to which said first indicator means is set.

16. Temperature control apparatus, comprising, in combination, a support; manually settable first indicator means mounted on said support for turning movement about a first axis and representing a selected desired temperature of a medium; temperature-responsive means including a temperature feeler adapted to sense the temperature of the medium; second indicator means for turning movement about a second axis and connected to said temperature-responsive means for indicating the temperature of the medium; a first temperature-deformable element secured to said first indicator means in the region of said first axis and having a deformable part spaced from said first axis and being movable relative to said first indicator means, said part having a first contact; a second element having a second contact cooperating with said first contact; means for heating the medium; circuit means for connecting said contacts to said means for heating the medium; resilient means connecting said second element with said second indicator means in the region of said second axis for turning movement with said second indicator means, and displaceable relative to the same in opposite directions of rotation; a third contact secured to said first indicator means for movement therewith, said second contact being located between said first and third contacts; a cooling means for the medium; said circuit means being connected to said second and third contacts and to said cooling means for activating said cooling means for the medium; heating wire means surrounding said first temperature-deformable element; and control means including potentiometer connected into said circuit means and to said heating wire means for controlling the current flowing through the same for varying the deformation of said first temperature-deformable element whereby the angular position of said first contact can be adjusted relative to said first indicator means so that said contacts separate when said temperature-responsive element senses a selectable temperature below the selected temperature to which said first indicator means is set.

17. Temperature control apparatus, comprising, in combination, manually settable means for representing a selected desired temperature of a medium; temperature-responsive means adapted to sense the temperature of the medium; a first temperature-deformable element secured to said manually settable means and having a deformable part movable relative to the same, said part having a first contact; a second temperature-deformable element having a second contact cooperating with said first contact; resilient means connecting said second temperature-deformable element with said temperature-responsive means for movement with the same, and displaceable relative to the same so that said member is displaced when said contacts engage each other while the temperature of the medium is different from the selected temperature; means for heating the medium; circuit means for connecting said contacts to said means for heating the medium; heating wire means for first temperature-deformable element and connected into said circuit means; control means operatively connected to and controlling said heating wire means and connected into said circuit means for varying the deformation of said heated temperature-deformable element whereby the position of said first contact relative to said manually settable means can be adjusted so that said contacts separate when said temperature-responsive element senses a selectable temperature below the selected temperature to which said settable means is set, said circuit means including means for connecting said heating wire means to a power source when said contacts engage, and for disconnecting said heating wire means from the power source when said contacts disengage and effect termination of the heating of the medium so that said temperature-deformable element cools off when said contacts separate, and assumes another position in which said contacts again engage to effect again heating of the medium and then another separation of said contacts whereby an intermittent heating of the medium in the region of the desired selected temperature is effected.

18. Temperature control apparatus, comprising, in combination, a support; manually settable first indicator means mounted on said support for turning movement about a first axis and representing a selected desired temperature of a medium; temperature-responsive means including a temperature feeler adapted to sense the temperature of the medium; second indicator means for turning movement about a second axis and connected to said temperature-responsive means for indicating the temperature of the medium; a first temperature-deformable element secured to said first indicator means in the region of said first axis and having a deformable part spaced from said first axis and being movable relative to said first indicator means, said part having a first contact; a second element having a second contact cooperating with said first contact; means for heating the medium; circuit means for connecting said contacts to said means for heating the medium; resilient means connecting said second element with said second indicator means in the region of said second axis for turning movement with said second indicator means, and displaceable relative to the same; heating wire means surrounding said first temperature-deformable element and connected into said circuit means; control means including potentiometer means connected into said circuit means and to said heating wire means for controlling the current flowing through the same for varying the deformation of said first temperature-deformable element whereby the angular position of said first contact can be adjusted relative to said first indicator means so that said contacts separate when said temperature-responsive element senses a selectable temperature below the selected temperature to which said first indicator means is set, said circuit means including means for connecting said heating wire means to a power source when said contacts engage, and for disconnecting said heating wire means from the power source when said contacts disengage and effect termination of the heating of the medium so that said temperature-deformable element cools off when said contacts separate, and assumes another position in which said contacts again engage to effect again heating of the medium and then another separation of said contacts whereby an intermittent heating of the medium in the region of the desired selected temperature is effected.

19. An apparatus as set forth in claim 18 wherein said circuit means include a relay means energized when said contacts engage, and having relay contacts adapted to connect a power source to means for heating the medium.

20. Temperature control apparatus, comprising, in combination, manually settable means for representing a selected desired temperature of a medium; temperature-responsive means adapted to sense the temperature of the medium; a temperature-deformable element secured to one of said means and having a deformable part movable relative to the same, said part having a first contact; a member having a second contact cooperating with said first contact; resilient means connecting said member with the other of said means for movement with the same, and displaceable relative to the same so that said member is displaced when said contacts engage each other while the temperature of the medium is different from the selected temperature; means for heating the medium; circuit means for connecting said contacts to said means for heating the medium and including means energized when said contacts engage and adapted to connect a power source to said means for heating the medium; heating wire means for heating said temperature-deformable element, said circuit means including means for connecting said heating wire means to a power source when said contacts engage, and for disconnecting said heating wire means from the power source when said contacts disengage and effect termination of the heating of the medium so that said temperature-deformable element cools off when said contacts separate, and assumes another position in which said contacts again engage to effect again heating of the medium and then another separation of said contacts whereby an intermittent heating of the medium in the region of the desired selected temperature is effected.

References Cited in the file of this patent
UNITED STATES PATENTS

| | | |
|---|---|---|
| 2,403,798 | Holmes | July 9, 1946 |
| 2,846,531 | Baker | Aug. 5, 1957 |
| 2,914,644 | Holtkamp | Nov. 24, 1959 |
| 2,963,566 | Ross et al. | Dec. 6, 1960 |